United States Patent
Kitamura et al.

(10) Patent No.: US 10,596,520 B2
(45) Date of Patent: Mar. 24, 2020

(54) DESALINATION APPARATUS

(71) Applicant: Hitachi, Ltd., Tokyo (JP)

(72) Inventors: Kotaro Kitamura, Tokyo (JP); Hiroki Miyakawa, Tokyo (JP); Koji Fukuzaki, Tokyo (JP)

(73) Assignee: HITACHI, LTD., Tokyo (JP)

(*) Notice: Subject to any disclaimer, the term of this patent is extended or adjusted under 35 U.S.C. 154(b) by 209 days.

(21) Appl. No.: 15/613,587

(22) Filed: Jun. 5, 2017

(65) Prior Publication Data

US 2017/0354930 A1    Dec. 14, 2017

(30) Foreign Application Priority Data

Jun. 13, 2016 (JP) ................................. 2016-116988

(51) Int. Cl.
*B01D 61/02* (2006.01)
*B01D 61/06* (2006.01)
(Continued)

(52) U.S. Cl.
CPC ........... *B01D 61/12* (2013.01); *B01D 61/022* (2013.01); *B01D 61/06* (2013.01); *B01D 61/08* (2013.01); *C02F 1/008* (2013.01); *C02F 1/441* (2013.01); *B01D 2311/06* (2013.01); *B01D 2311/20* (2013.01); *B01D 2311/25* (2013.01); *B01D 2313/243* (2013.01); *B01D 2313/246* (2013.01);
(Continued)

(58) Field of Classification Search
None
See application file for complete search history.

(56) References Cited

U.S. PATENT DOCUMENTS

2003/0094406 A1   5/2003 Smith
2007/0295650 A1* 12/2007 Yoneda ................ B01D 61/025
                                                   210/97
(Continued)

FOREIGN PATENT DOCUMENTS

CN     103626311 A     3/2014
DE    102012002590 A1  8/2013
(Continued)

OTHER PUBLICATIONS

JP 2014104398 Machine Translation—Atsuyuki et al—Jun. 9, 2014 (Year: 2014).*
(Continued)

*Primary Examiner* — Bradley R Spies
(74) *Attorney, Agent, or Firm* — Baker Botts L.L.P.

(57) ABSTRACT

An object of the present invention is to provide a desalination apparatus in which a high pressure pump can be operated at a high efficient operation point even when temperature, salt concentration or the like of water to be treated vary. The desalination apparatus includes a high pressure pump which is provided in a first flow path and supplies raw water to a first module at high pressure to apply reverse osmotic pressure to a first module and a second module, a third flow path for supplying second concentrated water after separation in the second module to upstream of the high pressure pump in the first flow path, and a fourth flow path for supplying a portion of the first concentrated water after separation in the first module to upstream of the high pressure pump in the first flow path.

5 Claims, 6 Drawing Sheets

(51) Int. Cl.
    *B01D 61/08*     (2006.01)
    *B01D 61/12*     (2006.01)
    *C02F 1/44*     (2006.01)
    *C02F 103/08*     (2006.01)
    *C02F 1/00*     (2006.01)

(52) U.S. Cl.
    CPC .... *B01D 2317/025* (2013.01); *C02F 2103/08* (2013.01); *C02F 2209/001* (2013.01); *C02F 2209/005* (2013.01); *C02F 2209/03* (2013.01); *C02F 2209/05* (2013.01); *C02F 2209/40* (2013.01); *C02F 2303/10* (2013.01); *Y02A 20/131* (2018.01); *Y02W 10/30* (2015.05)

(56) References Cited

U.S. PATENT DOCUMENTS

| | | |
|---|---|---|
| 2010/0032377 A1 | 2/2010 | Wohlert |
| 2011/0220561 A1 | 9/2011 | Katayama et al. |
| 2013/0220792 A1 | 8/2013 | Ungerer et al. |
| 2013/0240446 A1* | 9/2013 | Pavan .................... B01D 61/12 |
| | | 210/650 |
| 2018/0318767 A1* | 11/2018 | Roitel .................... B01D 61/12 |

FOREIGN PATENT DOCUMENTS

| | | | |
|---|---|---|---|
| JP | 2004167423 A | 6/2004 | |
| JP | 2013-126636 A | 6/2013 | |
| JP | 2014104398 A | 6/2014 | |
| JP | 2014-184438 A | 10/2014 | |
| KR | 101314833 B1 * | 10/2013 | |
| WO | WO-2016074763 A1 * | 5/2016 | ............ B01D 61/12 |

OTHER PUBLICATIONS

KR 101314833 Machine Translation—Park Seong Sun—Oct. 11, 2013 (Year: 2013).*
Search Report and Written Opinion received for Singapore Patent Application No. 10201702832V, dated Feb. 9, 2018, 3 pages, and Feb. 20, 2018, 4 pages.

* cited by examiner

DESALINATION APPARATUS

CROSS REFERENCE TO RELATED APPLICATIONS

This application claims the foreign priority benefit under Title 35, United States Code, § 119 (a)-(d) of Japanese Patent Application No. 2016-116988, filed on Jun. 13, 2016, the disclosure of which is herein incorporated by reference in its entirety.

TECHNICAL FIELD

The present invention relates to a desalination apparatus.

BACKGROUND ART

As seawater desalination apparatuses, as shown in Patent Documents 1, 2, there are known systems for obtaining fresh water by reverse osmotic pressure by using a reverse osmosis membrane (RO membrane).

As such a desalination apparatus, there is known an apparatus having a two-stage structure of a first module and a second module. That is, the first module includes a RO membrane and separates seawater into permeate water and concentrated water by being subjected to reverse osmotic pressure. The permeate water having a salt concentration reduced in this way is further separated into permeate water and concentrated water by the second module having the same structure as the first module, so that the permeate water obtained by the second module is used for drinking or the like.

CITATION LIST

Patent Literature

[Patent Document 1]
Japanese Patent Application Publication No. 2014-184438
[Patent Document 2]
Japanese Patent Application Publication No. 2013-126636

SUMMARY OF INVENTION

Technical Problem

The reverse osmotic pressure is generated by a high pressure pump, and discharge pressure of the high pressure pump varies with an amount of water to be treated. When the amount of water to be treated is fixed, quality, temperature and salt concentration of the water to be treated are variation factors of the discharge pressure of the high pressure pump. Then, efficiency of the high pressure pump varies with the discharge pressure of the high pressure pump. As the temperature and salt concentration of the water to be treated vary, the discharge pressure of the high pressure pump varies as described above, and the efficiency of the high pressure pump is reduced in some cases.

It is desirable that the discharge pressure of the high pressure pump is equalized as much as possible and the high pressure pump is operated at an efficient operation point as high as possible. Therefore, an object of the present invention is to provide a desalination apparatus in which a high pressure pump can be operated at a high efficient operation point even when temperature, salt concentration or the like of water to be treated vary.

Solution to Problem

In order to solve the above problems, one embodiment of the present invention is a desalination apparatus includes: a first module for separating raw water into first permeate water and first concentrated water by a reverse osmosis membrane; a first flow path for supplying the raw water to the first module; a second module for separating the first permeate water after separation in the first module into second permeate water and second concentrated water by a reverse osmosis membrane; a second flow path for supplying the first permeate water after separation in the first module to the second module; a high pressure pump which is provided in the first flow path and supplies the raw water to the first module at high pressure to apply reverse osmotic pressure to the first module and the second module; a third flow path for supplying the second concentrated water after separation in the second module to upstream of the high pressure pump in the first flow path; and a fourth flow path for supplying a portion of the first concentrated water after separation in the first module to upstream of the high pressure pump in the first flow path.

Advantageous Effects of Invention

According to the present invention, it is possible to provide a desalination apparatus in which a high pressure pump can be operated at a high efficient operation point even when temperature, salt concentration or the like of water to be treated vary. Problems, configurations and effects other than those described above will be apparent from the following description of embodiments.

DESCRIPTION OF EMBODIMENTS

Hereinafter, embodiments of the present invention will be described with reference to the drawings.

Embodiment 1

Figure 1:
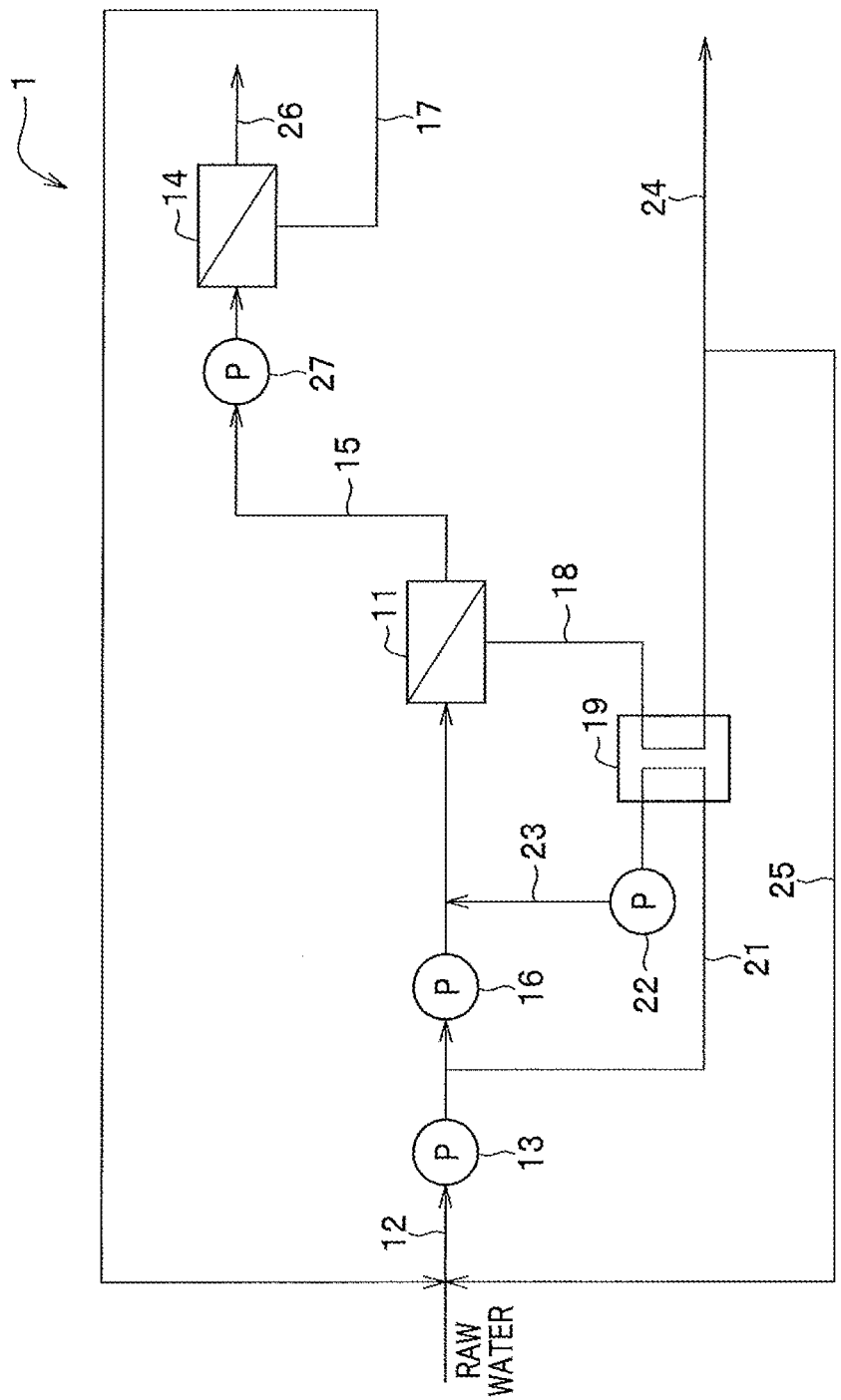
FIG. 1 is a system diagram of a desalination apparatus according to an embodiment 1 of the present invention.

FIG. 1 is a system diagram of a desalination apparatus 1 according to an embodiment 1. The desalination apparatus 1 includes a first module 11 which is provided with a reverse osmosis membrane and separates raw water (seawater) into first permeate water and first concentrated water having a salt concentration higher than that of the first permeate water by being subjected to reverse osmosis pressure. A first flow path (pipe) 12 supplies the raw water to the first module 11 by a supply pump 13. A second module 14 has the same structure as the first module 11 provided with a reverse osmosis membrane and separates the first permeate water after separation in the first module 11 into second permeate water and second concentrated water having a salt concentration higher than that of the second permeate water by being subjected to reverse osmosis pressure. A second flow path (pipe) 15 supplies the first permeate water after separation in the first module 11 to the second module 14 by a supply pump 27.

A high pressure pump 16 for applying reverse osmosis pressure to the first module 11 and consequently the second module 14 is provided on downstream of the supply pump 13 in the first flow path 12. A third flow path (pipe) 17 supplies the second concentrated water after separation in the second module 14 to upstream of the supply pump 13 and the high pressure pump 16 in the first flow path 12.

A first concentrated water flow path (pipe) 18 sends the first concentrated water to an energy recovery device (ERD) 19. Further, a branch flow path (pipe) 21 branched from upstream of the high pressure pump 16 on the downstream side of the supply pump 13 in the first supply path 12 sends a portion of the raw water to the energy recovery device 19. In the energy recovery device 19, water pressure energy of high-pressure first concentrated water is recovered by the raw water flowing through the branch flow path 21. High-pressure raw water discharged from the energy recovery apparatus 19 is further boosted by a booster pump 22 and is merged with the first flow path 12 downstream of the high pressure pump 16 through a merging flow path (pipe) 23.

While the first concentrated water discharged from the energy recovery device 19 is discharged outside the system through a discharging flow path 24, a portion of the first concentrated water is supplied to upstream of the supply pump 13 and the high pressure pump 16 in the first flow path 12 through a fourth flow path (pipe) 25 branched from the discharging flow path 24. The first permeate water discharged from the second module 14 is discharged outside the system through a discharging flow path 26 to be used as drinking water or the like.

The reverse osmotic pressure applied to the first module 11 and the second module 14 is generated by the high pressure pumps 16, 27, however, discharge pressure of the high pressure pump 16 varies with an amount of the raw water to be treated. When the amount of the raw water is fixed, quality, temperature and salt concentration of the raw water to be treated are variation factors of the discharge pressure of the high pressure pump 16. For example, when the salt concentration of the raw water is high, it is necessary to increase the discharge pressure of the high pressure pump 16 to apply high reverse osmotic pressure to the first module 11 and consequently the second module 14.

Then, efficiency of the high pressure pump 16 varies with the discharge pressure of the high pressure pump 16. As the temperature and salt concentration of the water to be treated vary, the discharge pressure of the high pressure pump 16 varies as described above, and the efficiency of the high pressure pump 16 is reduced in some cases. That is, for example, when the salt concentration of the water to be treated is high, the second permeated water cannot be properly obtained unless the reverse osmotic pressure in the first module 11 and the second module 14 is increased, and thus the discharge pressure of the high pressure pump 16 is controlled to be increased. Therefore, in order to adjust the discharge pressure of the high pressure pump 16, the high pressure pump 16 may be provided with an inverter. When the high pressure pump 16 is a fixed speed pump, a flow rate of the raw water to the high pressure pump 16 may be adjusted by a flow control valve.

However, when the inverter is used, there is a problem that the efficiency of the high pressure pump 16 cannot be adjusted to the best efficiency. On the other hand, when the high pressure pump 16 is the fixed speed pump and the flow control valve is used, there is a problem that energy loss occurs in the flow control valve. Therefore, it is desirable that the discharge pressure of the high pressure pump 16 is equalized as much as possible and the high pressure pump 16 is operated at an efficient operation point as high as possible while avoiding these problems.

Therefore, in the present embodiment, in addition to returning the second concentrated water to upstream of the high pressure pump 16 in the first flow path 12 through the third flow path 17, a portion of the first concentrated water having a salt concentration higher than that of the second concentrated water is returned to upstream of the high pressure pump 16 through the fourth flow path 25. Thus, it is possible to adjust the salt concentration of the raw water flowing through the first flow path 12, thereby making it easier to adjust the discharge pressure of the high pressure pump 16 to be constant.

Embodiment 2

Figure 2:
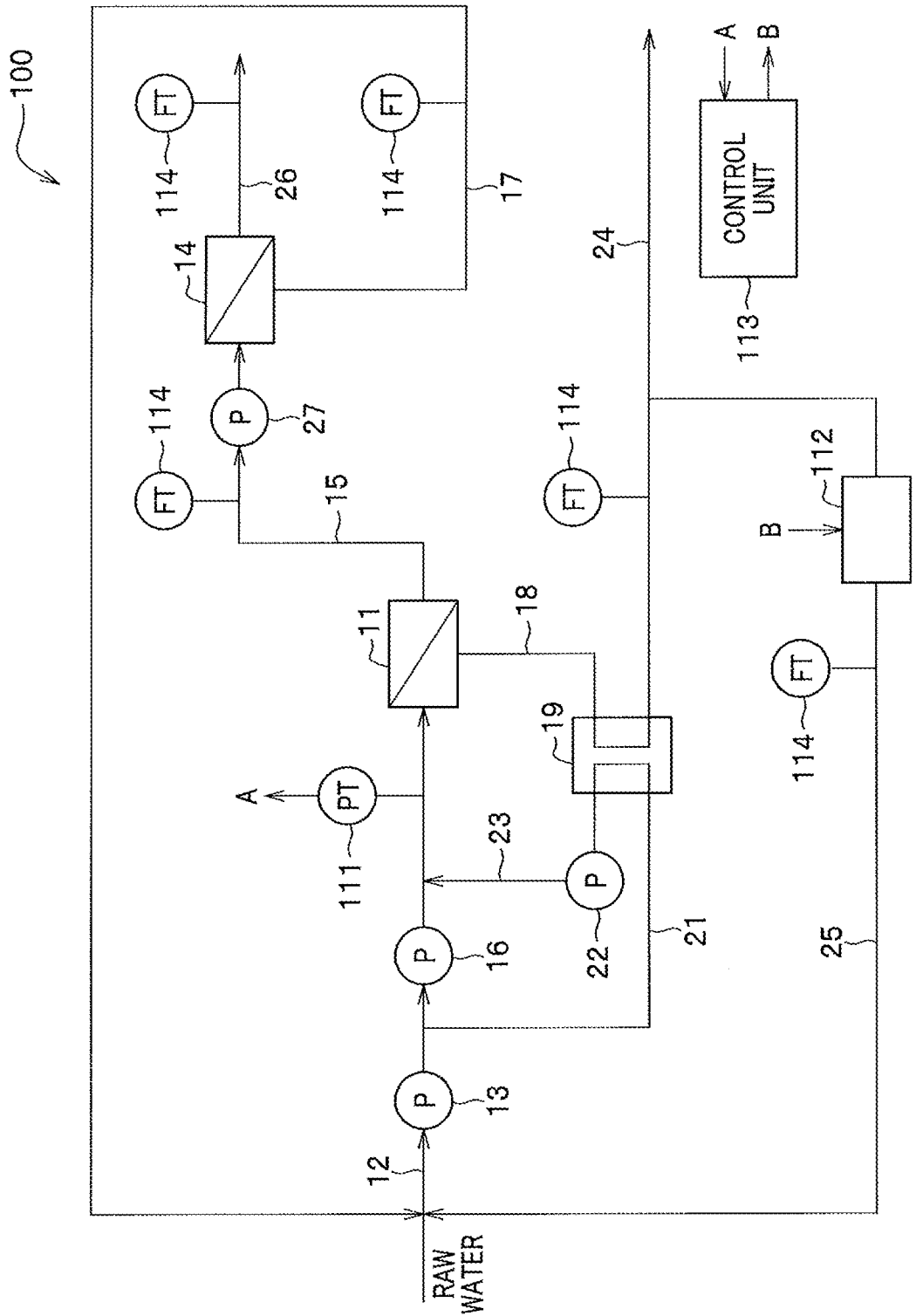
FIG. 2 is a system diagram of a desalination apparatus according to an embodiment 2 of the present invention.

FIG. 2 is a system diagram of a desalination apparatus 100 according to an embodiment 2. In FIG. 2, members denoted by the same reference numerals as FIG. 1 are the same as the embodiment 1, and thus a detailed description thereof will be omitted.

The desalination apparatus 100 of the embodiment 2 is different from the desalination apparatus 1 of the embodiment 1 in that firstly a pressure detector (pressure gauge) 111 for detecting water pressure is provided upstream of the first module 11 and downstream of a merging point of the first flow path 12 and the merging flow path 23 on the discharge side of the high pressure pump 16. The pressure detector 111 can determine the discharge pressure of the high pressure pump 16.

Further, the fourth flow path 25 is provided with a flow controller 112 for adjusting a flow rate of the first concentrated water flowing through the fourth flow path 25. In particular, the flow controller 112 can be configured with a variable flow pump, a flow control valve and the like. Further, the desalination apparatus 100 includes a control unit 113 to which the pressure detector 111 and the flow controller 112 is connected. Note that, the second flow path 15, the third flow path 17, the fourth flow path 25, a fifth flow path 24 and a sixth flow path 26 are respectively provided with flowmeters 114.

Next, an operation of the present desalination device 100 will be described. Since the pressure detector 111 can determine the discharge pressure (including water pressure of the raw water flowing into the first flow path 12 from the merging flow path 23) of the high pressure pump 16, the control unit 113 controls the flow controller 112 based on a detection result of the pressure detector 111, to adjust the amount of the first concentrated water flowing through the fourth flow path 25. In particular, the discharge pressure of the high pressure pump 16 is increased as the salt concentration of the raw water is increased, and the discharge pressure of the high pressure pump 16 is decreased as the salt concentration of the raw water is decreased. Therefore, when the water pressure detected by the pressure detector 111 is lower than a target value, the control unit 113 controls the flow controller 112 to increase an amount of the first concentrated water having a high salt concentration and supplied to the first flow path 12. On the other hand, when the water pressure detected by the pressure detector 111 is higher than the target value, the control unit 113 controls the flow controller 112 to decrease the amount of the first concentrated water having a high salt concentration and supplied to the first flow path 12. Thus, as the salt concentration of the raw water is adjusted, the discharge pressure of the high pressure pump 16 is also adjusted. Accordingly, it is possible to equalize the discharge pressure of the high pressure pump 16 as much as possible, and to operate the high pressure pump 16 at an efficient operation point as high as possible.

Embodiment 3

Figure 3:
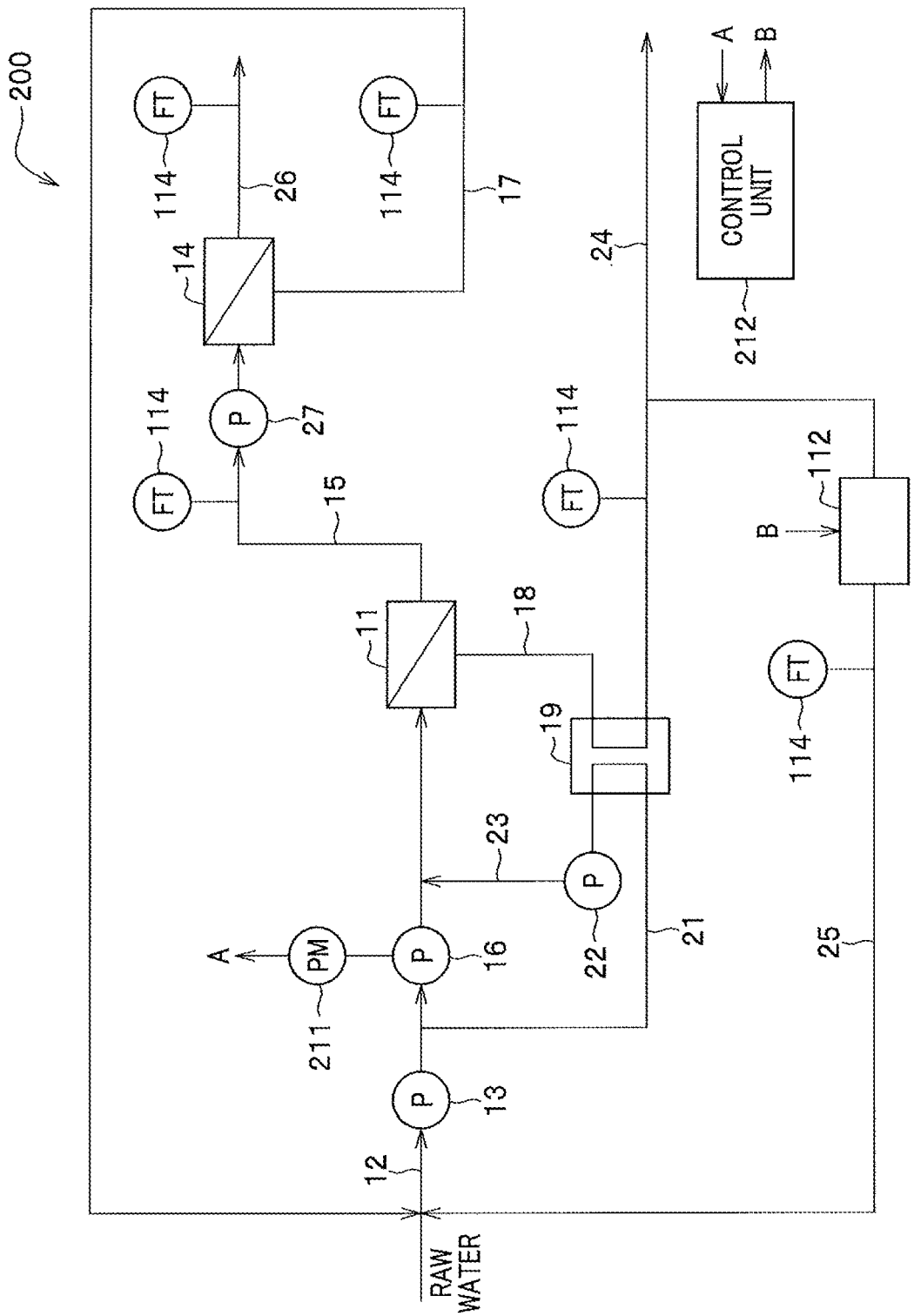
FIG. 3 is a system diagram of a desalination apparatus according to an embodiment 3 of the present invention.

FIG. 3 is a system diagram of a desalination apparatus 200 according to an embodiment 3. In FIG. 3, members denoted by the same reference numerals as FIG. 2 are the same as the embodiment 2, and thus a detailed description thereof will be omitted. The desalination apparatus 200 of the embodiment 3 is different from the desalination apparatus 100 of the embodiment 2 in that the high pressure pump 16 is provided with a power detector (power meter) 211 for detecting consumption power of the high pressure pump 16 instead of the pressure detector 111. Further, the desalination apparatus 200 is provided with a control unit 212 to which the power detector 211 and the flow controller 112 is connected.

Next, an operation of the present desalination device 200 will be described. As the discharge pressure of the high pressure pump 16 increases or decreases, the consumption power of the high pressure pump 16 also increases or decreases, and thus it is possible to estimate the discharge pressure of the high pressure pump 16 by measuring the consumption power of the high pressure pump 16. Therefore, a target value is set to the consumption power of the high pressure pump 16, and when the consumption power of the high pressure pump 16 is lower than the target value, the control unit 212 controls the flow controller 112 to increase the amount of the first concentrated water having a high salt concentration and supplied to the first flow path 12. On the other hand, when the consumption power of the high pressure pump 16 is higher than the target value, the control unit 212 controls the flow controller 112 to decrease the amount of the first concentrated water having a high salt concentration and supplied to the first flow path 12. Thus, as the salt concentration of the raw water is adjusted, the discharge pressure of the high pressure pump 16 is also adjusted. Accordingly, it is possible to equalize the discharge pressure of the high pressure pump 16 as much as possible, and to operate the high pressure pump 16 at an efficient operation point as high as possible.

Embodiment 4

Figure 4:
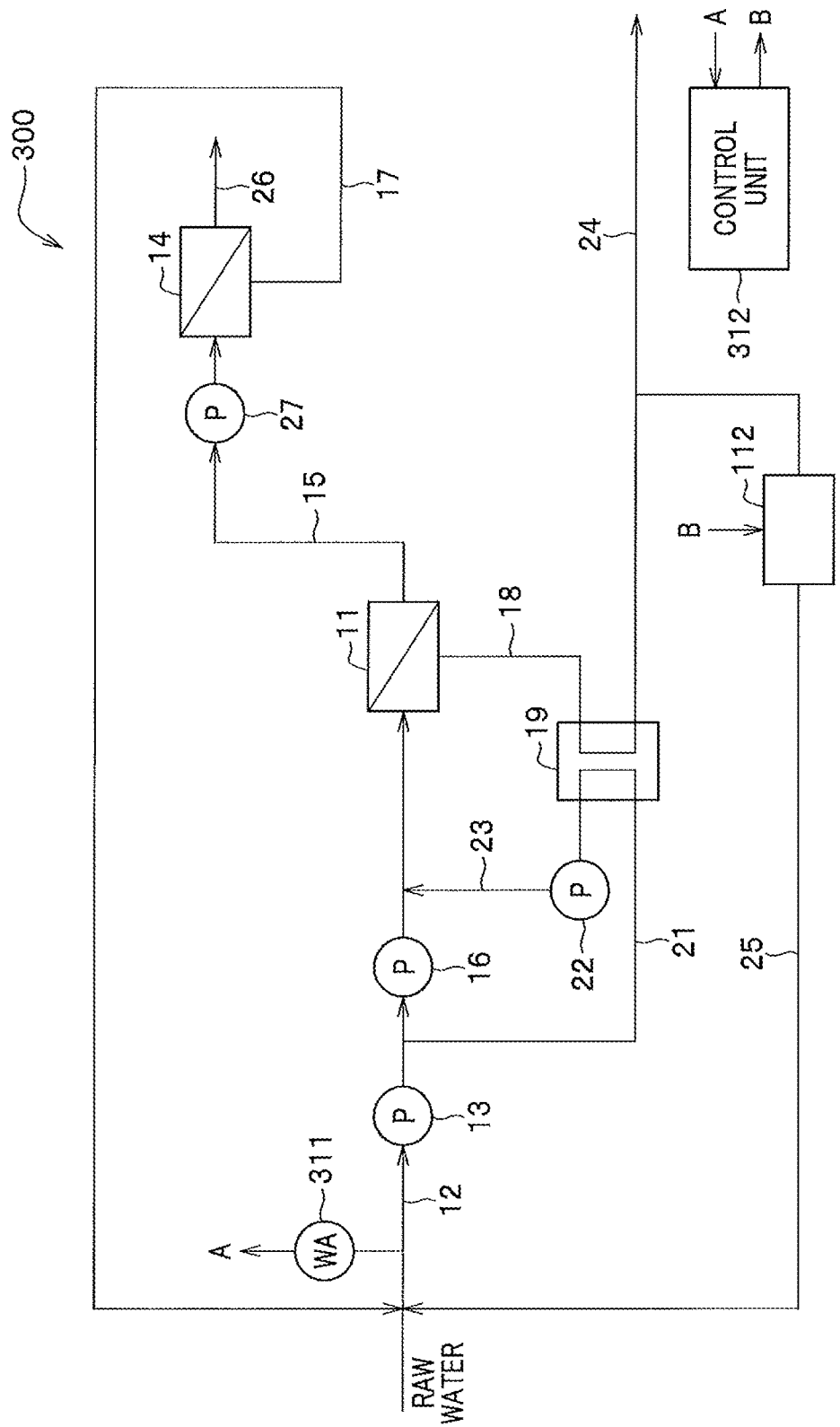
FIG. 4 is a system diagram of a desalination apparatus according to an embodiment 4 of the present invention.

FIG. 4 is a system diagram of a desalination apparatus 300 according to an embodiment 4. In FIG. 4, members denoted by the same reference numerals as FIG. 2 are the same as the embodiment 2, and thus a detailed description thereof will be omitted. The desalination apparatus 300 of the embodiment 4 is different from the desalination apparatus 100 of the embodiment 2 in that, instead of the pressure detector 111, a salt concentration detector 311 for detecting salt concentration of the water is provided in the first flow path 12 or in another flow path upstream of the first module 11. FIG. 4 shows an example in which the salt concentration detector 311 is provided upstream of the supply pump 13 in the first flow path 12, however, the present invention is not limited thereto, but it is possible to provide the salt concentration detector 311 at any position of the first flow path 12 or at any position of the merging flow path 23. It is possible to use a conductivity meter, a salt concentration meter, a TDS (Total Dissolved Solids) meter or the like as the salt concentration detector 311. Further, the desalination apparatus 300 is provided with a control unit 312 to which the salt concentration detector 311 and the flow controller 112 is connected.

Next, an operation of the present desalination device 300 will be described. It is possible to detect the salt concentration of the raw water by the salt concentration detector 311. When the salt concentration of the raw water is low, the discharge pressure of the high pressure pump 16 is lower than a target value, and thus the control unit 312 controls the flow controller 112 to increase the flow rate of the first concentrated water having a high salt concentration in the fourth flow path 25. On the other hand, when the salt concentration of the raw water is high, the discharge pressure of the high pressure pump 16 is higher than the target value, and thus the control unit 312 controls the flow controller 112 to decrease the flow rate of the first concentrated water having a high salt concentration in the fourth flow path 25. Accordingly, it is possible to equalize the discharge pressure of the high pressure pump 16 as much as possible, and to operate the high pressure pump 16 at an efficient operation point as high as possible.

Embodiment 5

Figure 5:
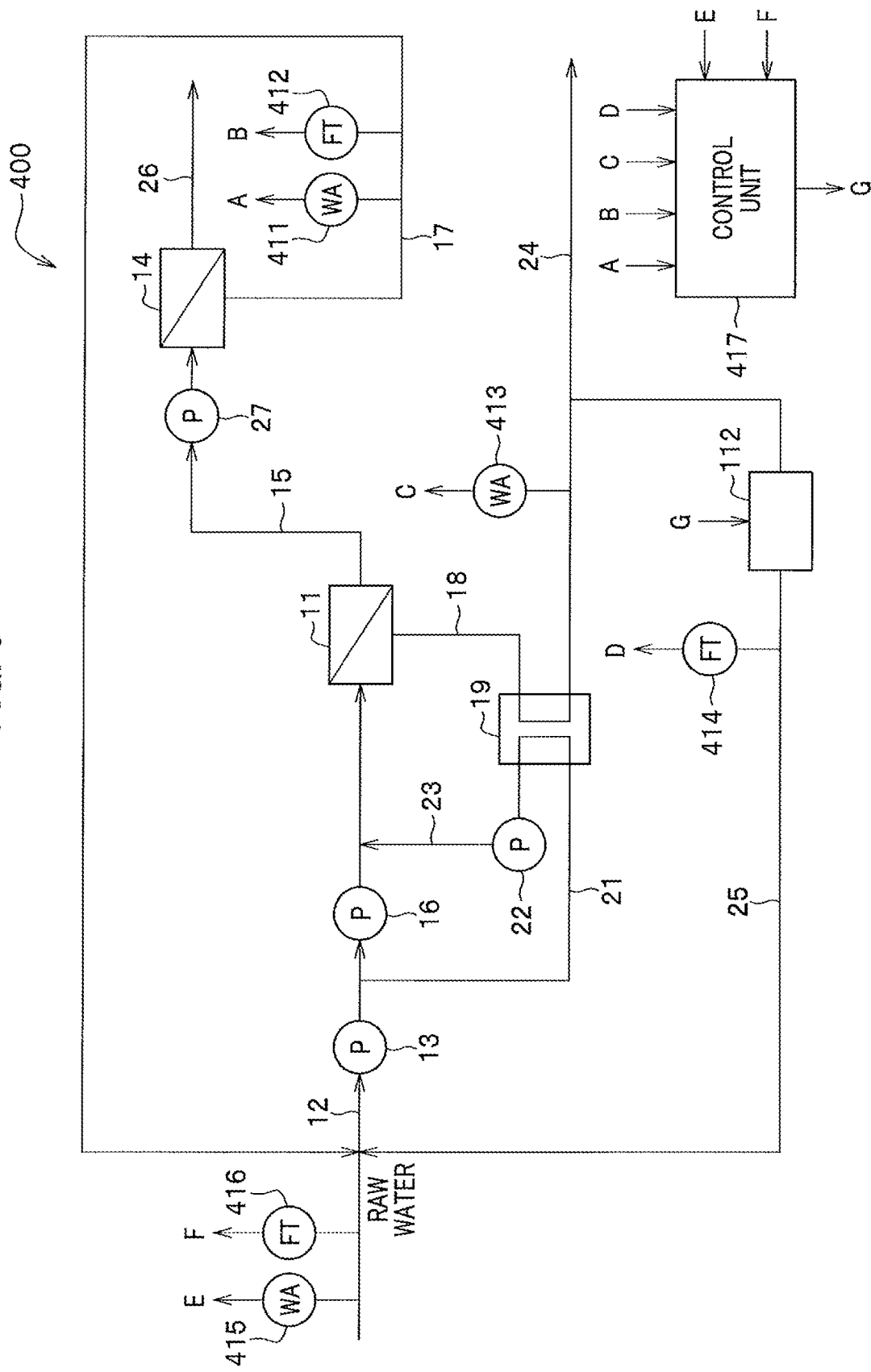
FIG. 5 is a system diagram of a desalination apparatus according to an embodiment 5 of the present invention.

FIG. 5 is a system diagram of a desalination apparatus 400 according to an embodiment 5. In FIG. 5, members denoted by the same reference numerals as FIG. 2 are the same as the embodiment 2, and thus a detailed description thereof will be omitted. The desalination apparatus 400 of the embodiment 5 is different from the desalination apparatus 100 of the embodiment 2 in that the desalination apparatus 400 includes the following sensors instead of the pressure detector 111. First, the third flow path 17 is provided with a first salt concentration detector 411 for detecting a salt concentration WA1 of the second concentrated water. Further, the third flow path 17 is provided with a first flow rate detector (flowmeter) 412 for detecting a water flow rate FT1 in the third flow path 17. The fifth flow path 24 (or the fourth flow path 25) is provided with a second salt concentration detector 413 for detecting a salt concentration WA2 of the first concentrated water. The fourth flow path 25 is provided with a second flow rate detector 414 for detecting a water flow rate FT2 in the fourth flow path 25. A third salt concentration detector 415 for detecting a salt concentration WA3 is provided in the first flow path 12 before merging with the third flow path 17 and the fourth flow path 25. A third flow rate detector 416 for detecting a flow rate FT3 of the raw water is also provided in the first flow path 12 before merging with the third flow path 17 and the fourth flow path 25.

Further, the desalination apparatus 400 is provided with a control unit 417 to which the first salt concentration detector 411, the first flow rate detector 412, the second salt concentration detector 413, the second flow rate detector 414, the third salt concentration detector 415, the third flow rate detector 416 and the flow controller 112 are connected.

Next, an operation of the present desalination device 400 will be described. First, the control unit 417 calculates "WA1×FT1+WA2×FT2+WA3×FT3" based on respective values detected by the first salt concentration detector 411, the first flow rate detector 412, the second salt concentration detector 413, the second flow rate detector 414, the third salt concentration detector 415 and the third flow rate detector 416. Thus, an amount of salt per unit flow rate contained in the water flowing into the high pressure pump 16 and the first module 11 is determined. Next, the control unit 417 calculates "FT1+FT2+FT3" to determine an amount of water per unit time flowing into the high pressure pump 16 and the first module 11. Then, the control unit 417 can determine the salt concentration of the water flowing into the high pressure pump 16 and the first module 11 by calculating "(WA1×FT1+WA2×FT2+WA3×FT3)/(FT1+FT2+FT3)".

Then, the control unit 417 compares the salt concentration determined in this way with a target value. When the salt concentration is lower than the target value, the discharge pressure of the high pressure pump 16 is lower than the target value, and thus the control unit 417 controls the flow controller 112 to increase the flow rate of the first concentrated water flowing through the fourth flow path 25. Thus, the salt concentration of the water flowing into the first module 11 is increased. On the other hand, when the salt concentration is higher than the target value, the discharge pressure of the high pressure pump 16 is higher than the target value, and thus the control unit 417 controls the flow controller 112 to decrease the flow rate of the first concentrated water flowing through the fourth flow path 25. Thus, the salt concentration of the water flowing into the first module 11 is decreased. Accordingly, it is possible to equalize the discharge pressure of the high pressure pump 16 as much as possible, and to operate the high pressure pump 16 at an efficient operation point as high as possible.

Embodiment 6

Figure 6:
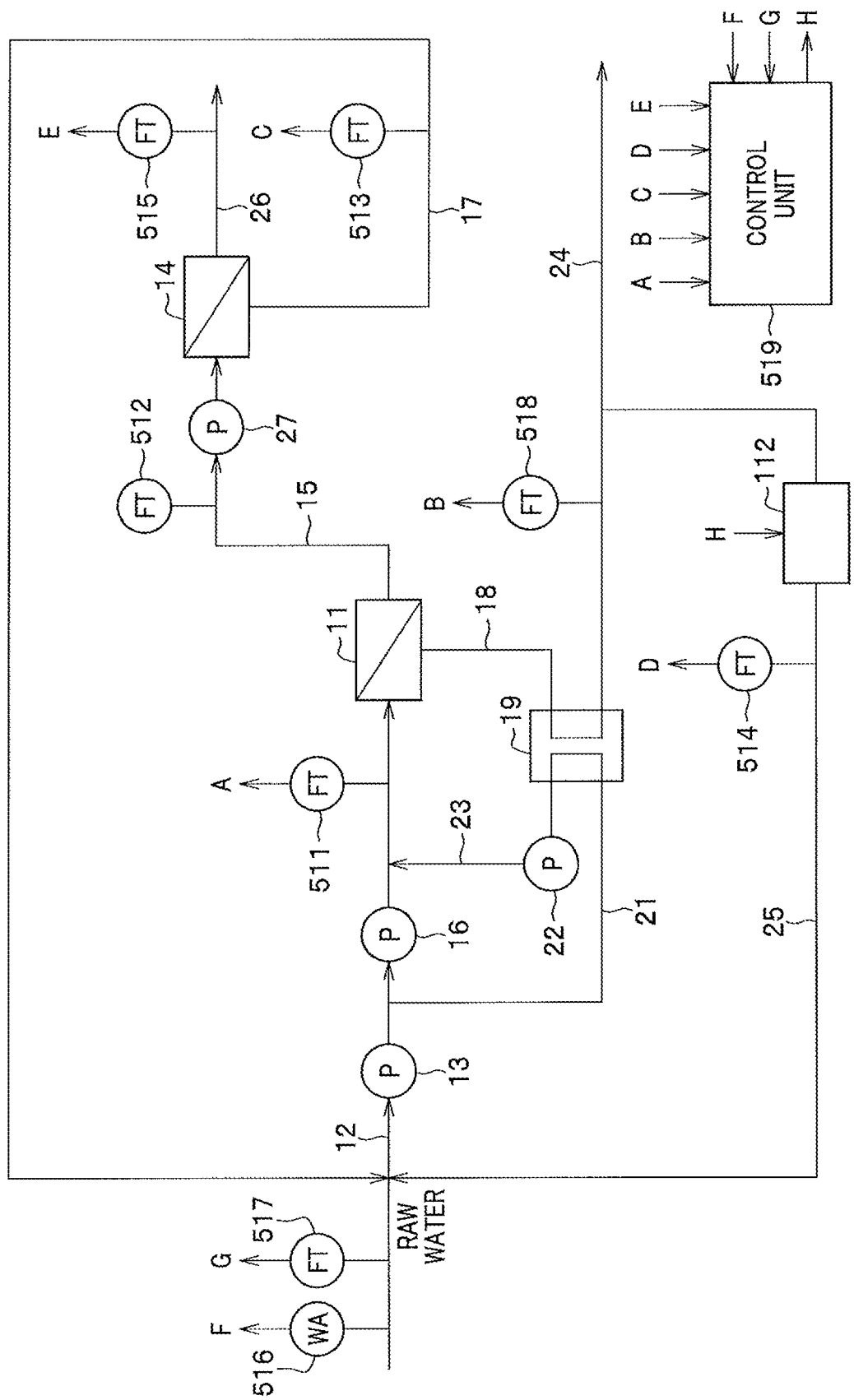
FIG. 6 is a system diagram of a desalination apparatus according to an embodiment 6 of the present invention.

FIG. 6 is a system diagram of a desalination apparatus 500 according to an embodiment 6. In FIG. 6, members denoted by the same reference numerals as FIG. 2 are the same as the embodiment 2, and thus a detailed description thereof will be omitted. First, the desalination apparatus 500 of the embodiment 6 is different from the desalination apparatus 100 of the embodiment 2 in that the desalination apparatus 500 includes a first flow rate detector 511 for detecting a water flow rate in the first flow path 12. Further, the desalination apparatus 500 includes a second flow rate detector 518 for detecting a water flow rate in a fifth flow path 18, a third flow rate detector 512 for detecting a water flow rate in the second flow path 15, a fourth flow rate detector 513 for detecting the water flow rate FT1 in the third flow path 17, and a sixth flow rate detector 514 for detecting the water flow rate FT2 in the fourth flow path 25.

Further, the desalination apparatus 500 also includes a third salt concentration detector 516 for detecting the salt concentration WA3 in the first flow path 12 before merging with the third flow path 17 and the fourth flow path 25, and a seventh flow rate detector 517 for detecting the water flow rate FT3 in the first flow path 12 before merging with the third flow path 17 and the fourth flow path 25. Further, the desalination apparatus 500 is provided with a control unit 519 to which the first flow rate detector 511, the second flow rate detector 518, the third flow rate detector 512, the fourth flow rate detector 513, the sixth flow rate detector 514, the third salt concentration detector 516, the seventh flow rate detector 517 and the flow controller 112 are connected.

Next, an operation of the present desalination device 500 will be described. First, in the first module 11 and the second module 14, removal rate of salt from water is determined by a selected reverse osmosis membrane. Therefore, the control unit 519 estimates a salt concentration N1 of the first concentrated water from flow distribution of the water flow rate detected by the first flow rate detector 511 between the first permeate water detected by the third flow rate detector 512 and the first concentrated water detected by the second flow rate detector 518. The control unit 519 also estimates a salt concentration N2 of the second concentrated water from flow distribution of a flow rate of the first permeate water detected by the third flow rate detector 512 between the second permeate water detected by the fifth flow rate detector 515 and the second concentrated water detected by the fourth flow rate detector 513.

Then, the control unit 519 calculates "N1×FT2+N2×FT1+WA3×FT3" to determine the amount of salt per unit flow rate contained in the water flowing into the high pressure pump 16 and the first module 11 is determined. Next, the control unit 519 calculates "FT1+FT2+FT3" to determine the amount of water per unit time flowing into the high pressure pump 16 and the first module 11. Then, the control unit 519 can determine the salt concentration of the water on a suction side of the high pressure pump 16 by calculating "(N1×FT2+N2×FT1+WA3×FT3)/(FT1+FT2+FT3)". Thus, the control unit 519 controls the flow rate of the first concentrated water flowing into the first flow path 12 through the fourth flow path 25 by the flow controller 112 so that the salt concentration is a predetermined value which is the target value. That is, when the salt concentration is lower than the target value, the discharge pressure of the high pressure pump 16 is lower than the target value, and thus the control unit 519 controls the flow controller 112 to increase the flow rate of the first concentrated water flowing through the fourth flow path 25. Thus, the salt concentration of the water flowing into the first module 11 is increased. On the other hand, when the salt concentration is higher than the target value, the discharge pressure of the high pressure pump 16 is higher than the target value, and thus the control unit 519 controls the flow controller 112 to decrease the flow rate of the first concentrated water flowing through the fourth flow path 25. Thus, the salt concentration of the water flowing into the first module 11 is decreased. Accordingly, it is possible to equalize the discharge pressure of the high pressure pump 16 as much as possible, and to operate the high pressure pump 16 at an efficient operation point as high as possible.

Note that, the present invention is not limited to the embodiments described above, but includes various modifications. For example, the above-described embodiments are described in detail in order to better illustrate the present invention, and the present invention is not necessarily limited to those having all components described above. Further, it is possible to replace a part of components in an embodiment with components in another embodiment, or to add components in another embodiment to components in an embodiment. Further, a part of components in each embodiment can be deleted, replaced by or added with other components.

Further, each of the above-described components, functions, processing units or the like may be implemented by hardware, for example, by designing some or all of them with an integrated circuit. Further, each of the above-described components, functions or the like may be implemented by software for interpreting and executing a program implementing each function by a processor. Information such as a program, a table or a file for implementing each function can be stored in a recording device such as a memory, a hard disk or a SSD (Solid State Drive), or in a recording medium such as an IC card, a SD card or a DVD. Further, control lines and information lines considered to be necessary for description are shown, and all the control lines and information lines required for the product are not necessarily shown. In fact, it is considered that almost all the components are connected to one another.

REFERENCE SIGNS LIST

1: desalination apparatus
11: first module
12: first flow path
14: second module
15: second flow path
16: high pressure pump
17: third flow path
18: fifth flow path
25: fourth flow path
26: sixth flow path
100: desalination apparatus
111: pressure detector
112: flow controller
113: control unit
200: desalination apparatus
211: power detector
212: control unit
300: desalination apparatus
311: salt concentration detector
312: control unit
400: desalination apparatus
411: first salt concentration detector
412: first flow rate detector
413: second salt concentration detector
414: second flow rate detector
415: third salt concentration detector
416: third flow rate detector
417: control unit
500: desalination apparatus
511: first flow rate detector
512: third flow rate detector
513: fourth flow rate detector
514: sixth flow rate detector
515: fifth flow rate detector
516: third flow rate detector
517: seventh flow rate detector
518: second flow rate detector
519: control unit

The invention claimed is:
1. A desalination apparatus comprising:
a first module for separating raw water into first permeate water and first concentrated water by a reverse osmosis membrane;
a first flow path for supplying the raw water to the first module;
a second module for separating the first permeate water after separation in the first module into second permeate water and second concentrated water by a reverse osmosis membrane;
a second flow path for supplying the first permeate water after separation in the first module to the second module;
a high pressure pump which is provided in the first flow path and supplies the raw water to the first module at high pressure to apply reverse osmotic pressure to the first module and the second module;
a third flow path for supplying the second concentrated water after separation in the second module to upstream of the high pressure pump in the first flow path; and
a fourth flow path for supplying a portion of the first concentrated water after separation in the first module to upstream of the high pressure pump in the first flow path;
a pressure detector provided downstream of the high pressure pump in the first flow path;
a flow controller provided in the fourth flow path to adjust a flow rate of the first concentrated water flowing through the fourth flow path; and
a control unit programmed to control the flow rate of the first concentrated water flowing into the first flow path through the fourth flow path by the flow controller based on a detection result of the pressure detector.

2. A desalination apparatus comprising:
a first module for separating raw water into first permeate water and first concentrated water by a reverse osmosis membrane;
a first flow path for supplying the raw water to the first module;
a second module for separating the first permeate water after separation in the first module into second permeate water and second concentrated water by a reverse osmosis membrane;
a second flow path for supplying the first permeate water after separation in the first module to the second module;
a high pressure pump which is provided in the first flow path and supplies the raw water to the first module at high pressure to apply reverse osmotic pressure to the first module and the second module;
a third flow path for supplying the second concentrated water after separation in the second module to upstream of the high pressure pump in the first flow path; and
a fourth flow path for supplying a portion of the first concentrated water after separation in the first module to upstream of the high pressure pump in the first flow path;
a power detector for detecting consumption power of the high pressure pump;
a flow controller provided in the fourth flow path to adjust a flow rate of the first concentrated water flowing through the fourth flow path; and
a control unit programmed to control the flow rate of the first concentrated water flowing into the first flow path through the fourth flow path by the flow controller based on a detection result of the power detector.

3. A desalination apparatus comprising:
a first module for separating raw water into first permeate water and first concentrated water by a reverse osmosis membrane;
a first flow path for supplying the raw water to the first module;
a second module for separating the first permeate water after separation in the first module into second permeate water and second concentrated water by a reverse osmosis membrane;
a second flow path for supplying the first permeate water after separation in the first module to the second module;
a high pressure pump which is provided in the first flow path and supplies the raw water to the first module at high pressure to apply reverse osmotic pressure to the first module and the second module;
a third flow path for supplying the second concentrated water after separation in the second module to upstream of the high pressure pump in the first flow path; and a fourth flow path for supplying a portion of the first concentrated water after separation in the first module to upstream of the high pressure pump in the first flow path;

a salt concentration detector provided in the first flow path or in another flow path upstream of the first module to detect salt concentration of water;

a flow controller provided in the fourth flow path to adjust a flow rate of the first concentrated water flowing through the fourth flow path; and a control unit programmed to control the flow rate of the first concentrated water flowing into the first flow path through the fourth flow path by the flow controller based on a detection result of the salt concentration detector.

4. A desalination apparatus comprising:

a first module for separating raw water into first permeate water and first concentrated water by a reverse osmosis membrane;

a first flow path for supplying the raw water to the first module;

a second module for separating the first permeate water after separation in the first module into second permeate water and second concentrated water by a reverse osmosis membrane;

a second flow path for supplying the first permeate water after separation in the first module to the second module;

a high pressure pump which is provided in the first flow path and supplies the raw water to the first module at high pressure to apply reverse osmotic pressure to the first module and the second module;

a third flow path for supplying the second concentrated water after separation in the second module to upstream of the high pressure pump in the first flow path; and a fourth flow path for supplying a portion of the first concentrated water after separation in the first module to upstream of the high pressure pump in the first flow path;

a first salt concentration detector for detecting a salt concentration WA1 of the second concentrated water;

a first flow rate detector for detecting a water flow rate FT1 in the third flow path;

a second salt concentration detector for detecting a salt concentration WA2 of the first concentrated water;

a second flow rate detector for detecting a water flow rate FT2 in the fourth flow path;

a third salt concentration detector for detecting a salt concentration WA3 in the first flow path before merging with the third flow path and the fourth flow path;

a third flow rate detector for detecting a water flow rate FT3 in the first flow path before merging with the third flow path and the fourth flow path;

a flow controller provided in the fourth flow path to adjust a flow rate of the first concentrated water flowing through the fourth flow path; and a control unit programmed to determine a salt concentration of water flowing into the high pressure pump by calculating "(WA1×FT1+WA2×FT2+WA3×FT3)/(FT1+FT2+FT3)", and programmed to control the flow controller based on the determined salt concentration to adjust the flow rate of the first concentrated water flowing into the first flow path through the fourth flow path.

5. A desalination apparatus comprising:

a first module for separating raw water into first permeate water and first concentrated water by a reverse osmosis membrane;

a first flow path for supplying the raw water to the first module;

a second module for separating the first permeate water after separation in the first module into second permeate water and second concentrated water by a reverse osmosis membrane;

a second flow path for supplying the first permeate water after separation in the first module to the second module;

a high pressure pump which is provided in the first flow path and supplies the raw water to the first module at high pressure to apply reverse osmotic pressure to the first module and the second module;

a third flow path for supplying the second concentrated water after separation in the second module to upstream of the high pressure pump in the first flow path; and a fourth flow path for supplying a portion of the first concentrated water after separation in the first module to upstream of the high pressure pump in the first flow path;

a first flow rate detector for detecting a water flow rate in the first flow path;

a fifth flow path through which the first concentrated water flows;

a second flow rate detector for detecting a water flow rate in the fifth flow path;

a third flow rate detector for detecting a water flow rate in the second flow path;

a fourth flow rate detector for detecting a water flow rate FT1 in the third flow path;

a sixth flow path through which the second permeate water flows;

a fifth flow rate detector for detecting a water flow rate in the sixth flow path;

a sixth flow rate detector for detecting a water flow rate FT2 in the fourth flow path;

a third salt concentration detector for detecting a salt concentration WA3 in the first flow path before merging with the third flow path and the fourth flow path;

a seventh flow rate detector for detecting a water flow rate FT3 in the first flow path before merging with the third flow path and the fourth flow path;

a flow controller provided in the fourth flow path to adjust a flow rate of the first concentrated water flowing through the fourth flow path; and a control unit programmed to estimate a salt concentration N1 of the first concentrated water from flow distribution of the water flow rate detected by the first flow rate detector between the first permeate water detected by the third flow rate detector and the first concentrated water detected by the second flow rate detector, programmed to estimate a salt concentration N2 of the second concentrated water from flow distribution of a flow rate of the first permeate water detected by the third flow rate detector between the second permeate water detected by the fifth flow rate detector and the second concentrated water detected by the fourth flow rate detector, and programmed to control the flow controller to adjust the flow rate of the first concentrated water flowing into the first flow path through the fourth flow path so that the salt concentration of water on a suction side of the high pressure pump obtained by calculating "(N1×FT2+N2×FT1+WA3×FT3)/(FT1+FT2+FT3)" is a predetermined value.

* * * * *